(12) United States Patent
Ikari (10) Patent No.: US 8,593,683 B2
(45) Date of Patent: Nov. 26, 2013

(54) IMAGE PROCESSING APPARATUS, IMAGE PROCESSING APPARATUS CONTROL METHOD AND STORAGE MEDIUM CAPABLE OF READING AN IMAGE OF A DOCUMENT TO BE CONVEYED AND MAKING SKEW FEED CORRECTION

(75) Inventor: Daiki Ikari, Ayase (JP)

(73) Assignee: Canon Kabushiki Kaisha, Tokyo (JP)

( * ) Notice: Subject to any disclaimer, the term of this patent is extended or adjusted under 35 U.S.C. 154(b) by 412 days.

(21) Appl. No.: 12/885,091

(22) Filed: Sep. 17, 2010

(65) Prior Publication Data

US 2011/0075168 A1 Mar. 31, 2011

(30) Foreign Application Priority Data

Sep. 25, 2009 (JP) ................. 2009-221380

(51) Int. Cl.
*G06K 15/00* (2006.01)
*H04N 1/60* (2006.01)
*B65H 5/22* (2006.01)
*B65H 3/44* (2006.01)
*B65H 5/08* (2006.01)

(52) U.S. Cl.
USPC .......... 358/1.9; 358/1.16; 358/1.18; 358/1.5; 271/3.13; 271/3.17; 271/10.02; 271/15

(58) Field of Classification Search
USPC ............... 358/1.9, 1.13, 1.14, 1.15, 1.5, 3.01, 358/3.12, 488, 496, 474, 401, 403, 505, 358/514, 449, 462, 498, 521, 2.1, 1.16, 358/1.18, 504; 271/227, 228, 10.12, 240, 271/238, 242, 245, 236, 246, 247, 261, 127, 271/3.13, 3.17, 3.24, 15, 10.02, 230, 233, 271/243, 265.02, 153, 224; 382/289, 286, 382/290, 296, 177, 294, 297, 305, 318, 323, 382/321, 276

See application file for complete search history.

(56) References Cited

U.S. PATENT DOCUMENTS

| | | | | |
|---|---|---|---|---|
| 4,613,125 | A * | 9/1986 | Jeschke | 271/227 |
| 5,681,036 | A * | 10/1997 | Wakahara et al. | 271/227 |
| 6,888,650 | B1 * | 5/2005 | Mizubata et al. | 358/488 |
| 2001/0006273 | A1* | 7/2001 | Butterfass et al. | 271/227 |
| 2004/0094891 | A1* | 5/2004 | Trovinger et al. | 271/227 |
| 2004/0150861 | A1* | 8/2004 | Van Der Heijden | 358/406 |
| 2005/0030600 | A1* | 2/2005 | Takagi et al. | 358/498 |
| 2006/0039629 | A1* | 2/2006 | Li et al. | 382/289 |

FOREIGN PATENT DOCUMENTS

| | | |
|---|---|---|
| JP | 8-81089 A | 3/1996 |
| JP | 10-32682 A | 2/1998 |
| JP | 2005-263396 A | 9/2005 |
| JP | 2007-104578 A | 4/2007 |

\* cited by examiner

*Primary Examiner* — Ngon Nguyen
(74) *Attorney, Agent, or Firm* — Canon U.S.A., Inc. IP Division (57) ABSTRACT

An apparatus includes a conveyance unit configured to convey a document, a first detection unit configured to detect a first deviation amount of the conveyed document by a leading edge of the document, a first correction unit configured to correct deviation of the conveyed document if the first deviation amount is larger than a predetermined value, an input unit configured to read the document the corrected deviation and to input image data, a second detection unit configured to detect a second deviation amount of the conveyed document by a trailing edge of the document, and a second correction unit configured to correct deviation of the document included in the input image data if the second deviation amount is larger than a predetermined value.

9 Claims, 11 Drawing Sheets

IMAGE PROCESSING APPARATUS, IMAGE PROCESSING APPARATUS CONTROL METHOD AND STORAGE MEDIUM CAPABLE OF READING AN IMAGE OF A DOCUMENT TO BE CONVEYED AND MAKING SKEW FEED CORRECTION

BACKGROUND OF THE INVENTION

1. Field of the Invention

The present invention relates to control of an image processing apparatus which reads an image of a document to be conveyed.

2. Description of the Related Art

Conventionally, in an image forming apparatus, there has been available a system referred to as "feeding-reading" in which a plurality of documents are set in an automatic document conveyance device and conveyed one by one, and the documents are read by an optical type reading apparatus fixed at a document reading position. In this system, a bar-like light source is used, and a reading line is set parallel to a longitudinal direction (main scanning direction), with the documents being conveyed in a direction (sub scanning direction) perpendicular to the reading line. Further, light is applied from the light source to an image surface of the document being conveyed. Reflection light when the image surface passes the reading line is received, and an image of the image surface is successively read.

Thus, when a document is conveyed obliquely, and an image thereof passes the reading line obliquely (which will be hereinafter referred to as skew feed), the image will be read obliquely. In the above image forming apparatus, when image formation is performed based on an image thus skew-fed, a defective image which is formed obliquely on a sheet may be produced.

To avoid production of such a defective image, there is a technique (See, for example, Japanese Patent Application Laid-Open No. 8-81089) in which two sensors are arranged in a document conveyance direction and in a direction perpendicular to the document conveyance direction in a document conveyance path, and inclination of a document is detected based on a signal indicating that the document has passed the sensors arranged at the respective positions to correct skew feed of the document.

In this method, a document conveyance speed of a conveyance roller pair, each driven independently, is controlled to correct the inclination of the document, so that it is possible to effect skew feed correction without temporarily stopping the conveyance of the document. Thus, as compared with other skew feed correction methods, it helps to enhance efficiency in document conveyance and to achieve a substantial improvement in terms of image forming speed.

Further, since a correction of high precision is difficult to perform with mechanical skew feed correction alone which is based on a difference in speed of the conveyance roller pair, there is available a technique in which digital image data read after the above correction is rotated to correct the inclination (See, for example, Japanese Patent Application Laid-Open No. 10-32682).

However, in the above described technique, the skew feed correction is divided into two phases, i.e., the mechanical correction based on the conveyance rollers and the software correction based on the read image data. Thus, it is necessary to provide the sensors for detecting inclination of the document at two positions on the document conveyance path, resulting in an increase in costs of the entire apparatus.

SUMMARY OF THE INVENTION

According to an aspect of the present invention, an apparatus includes a conveyance unit configured to convey a document, a first detection unit configured to detect a first deviation amount of the conveyed document by a leading edge of the document, a first correction unit configured to correct deviation of the conveyed document if the first deviation amount is larger than a predetermined value, an input unit configured to read the document the corrected deviation and to input image data, a second detection unit configured to detect a second deviation amount of the conveyed document by a trailing edge of the document, and a second correction unit configured to correct deviation of the document included in the input image data if the second deviation amount is larger than a predetermined value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

<Hardware of an Image Forming Apparatus>

Figure 1:
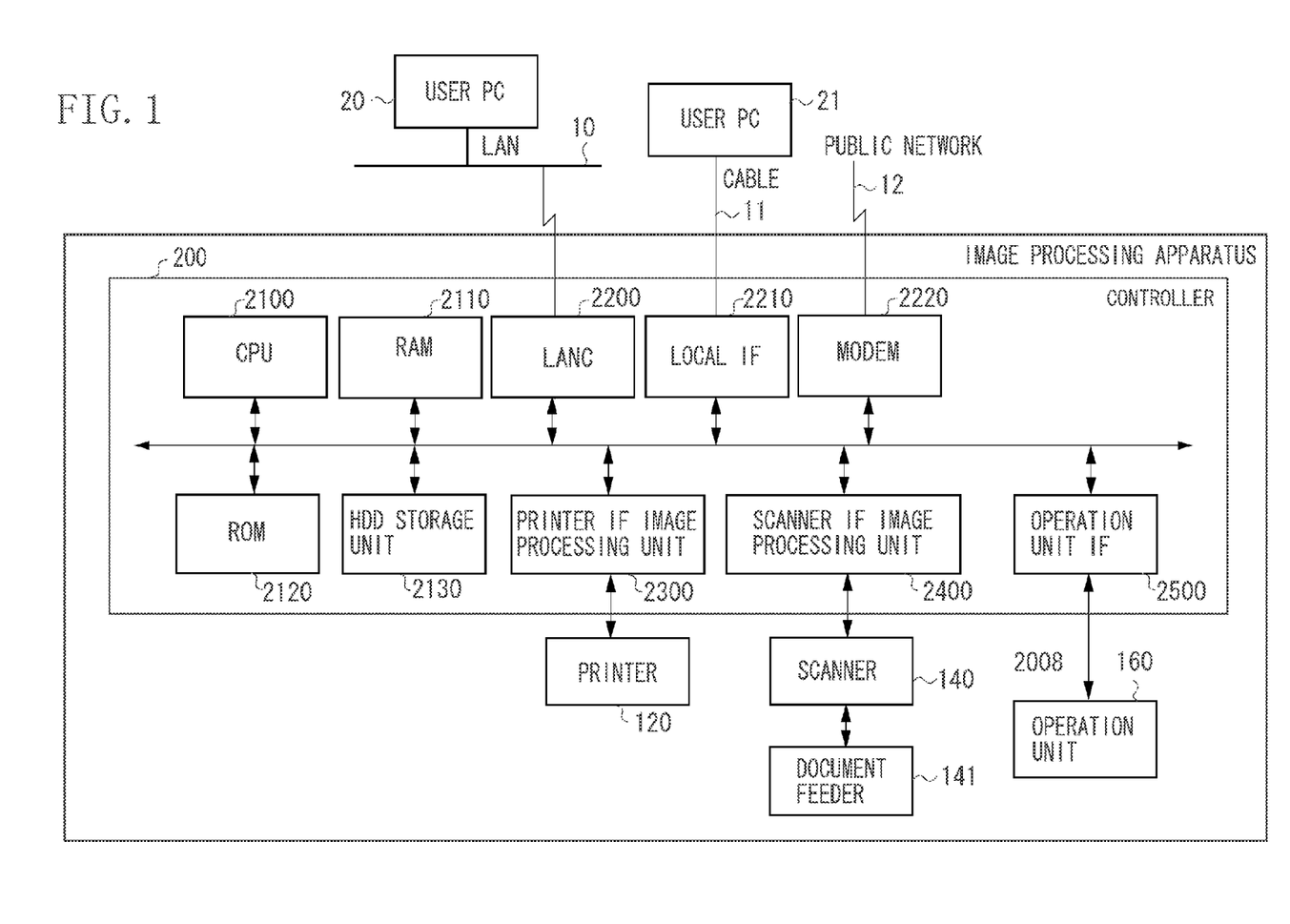
FIG. 1 is a block diagram illustrating a hardware configuration of an image processing apparatus.

FIG. 1 is a block diagram illustrating a hardware configuration of an image processing apparatus according to an exemplary embodiment of the present invention. In FIG. 1, a controller 200 is connected to a scanner 140 which is an image input device, a printer 120 which is an image output device, a local area network (LAN) 10, and a public network or wide area network (WAN) 12, to control in a centralized fashion operations of the image forming apparatus and to perform input/output control of image information and device information.

A central processing unit (CPU) 2100 is a processor controlling the entire image forming apparatus. It controls in a centralized fashion an access to the various connected devices based on a control program and the like stored in a read-only memory (ROM) 2120. Further, the CPU 2100 controls in a centralized fashion the various types of processing conducted inside the controller 200. A random access memory (RAM) 2110 is a system work memory and is also an image memory for temporarily storing image data or the like. The ROM 2120 is a boot ROM, and stores a system boot program. A hard disk drive (HDD) 2130 mainly stores requisite information (system software) for starting and operating a computer, and image data. Instead of storing them in the HDD 2130, it is also possible to store these items of data in a recording medium which can store and retain data even if the power source is turned off.

A LAN controller (LANC) 2200 is connected to the LAN 10, and performs input/output of output image data between itself and a user personal computer (PC) 20 and input/output of information related to apparatus control. A local interface (local IF) 2210 is an interface such as a Universal Serial Bus (USB) or a Centronics interface. The local IF 2210 is connected to a user PC 21 and a printer via a cable 11, and performs the input/output of data. A modulator-demodulator (MODEM) 2220 is connected to the public network 12, and performs the input/output of data. A printer interface (IF) image processing unit 2300 is connected to the printer 120, and performs communication with a CPU mounted in the printer 120.

Further, the printer IF image processing unit 2300 performs synchronous-type/non-synchronous-type conversion of image data, and an image processing for print output. A scanner interface (IF) image processing unit 2400 is connected to the scanner unit 140, and performs communication with a CPU mounted in the scanner unit 140.

Further, the scanner IF image processing unit 2400 performs synchronous-type/non-synchronous-type conversion of image data and an image processing such as a skew feed correction processing described below. An operation unit interface (IF) 2500 is an interface for outputting image data to be displayed on an operation unit 160 from the controller 200 to the operation unit 160 and outputting to the controller 200 information input from the operation unit 160 by a user of the image forming apparatus.

<Scanner IF Image Processing Unit>

Figure 2A:
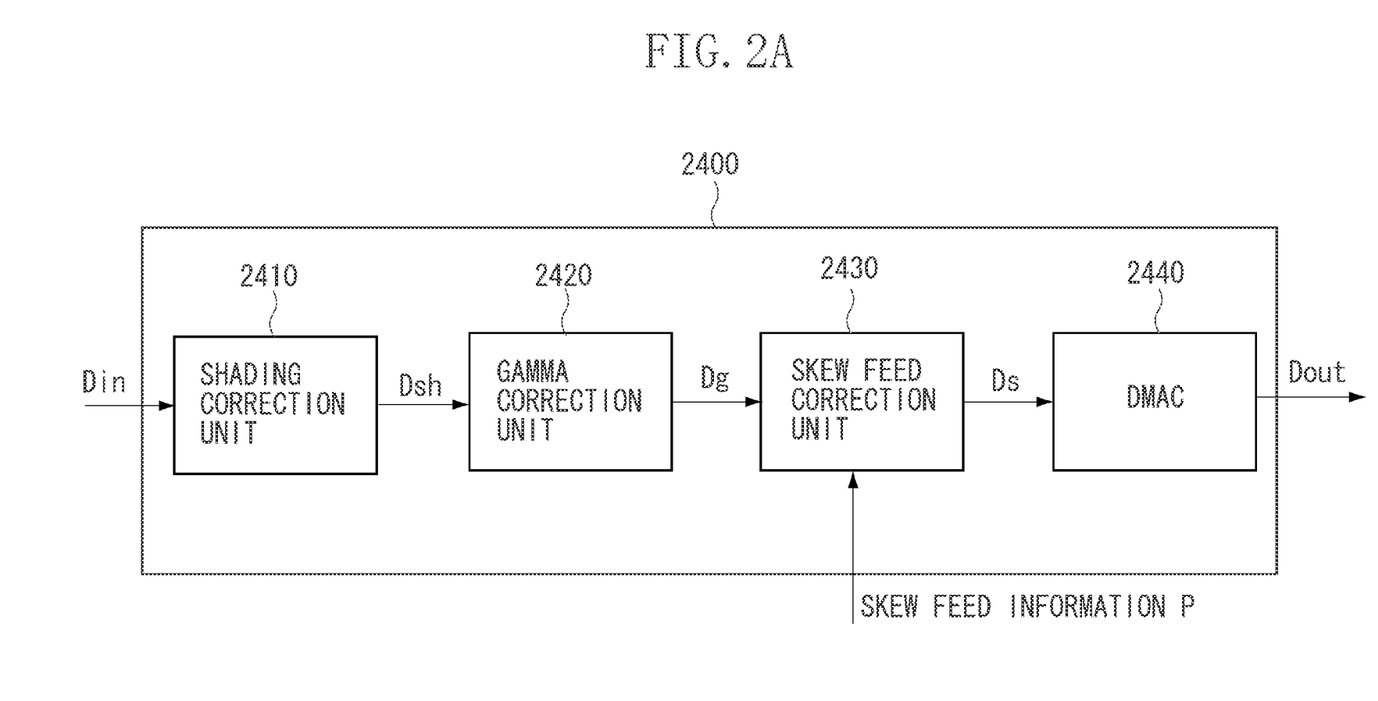
FIGS. 2A through 2C are block diagrams illustrating a configuration of a scanner interface (IF) image processing unit.
Figure 2B:
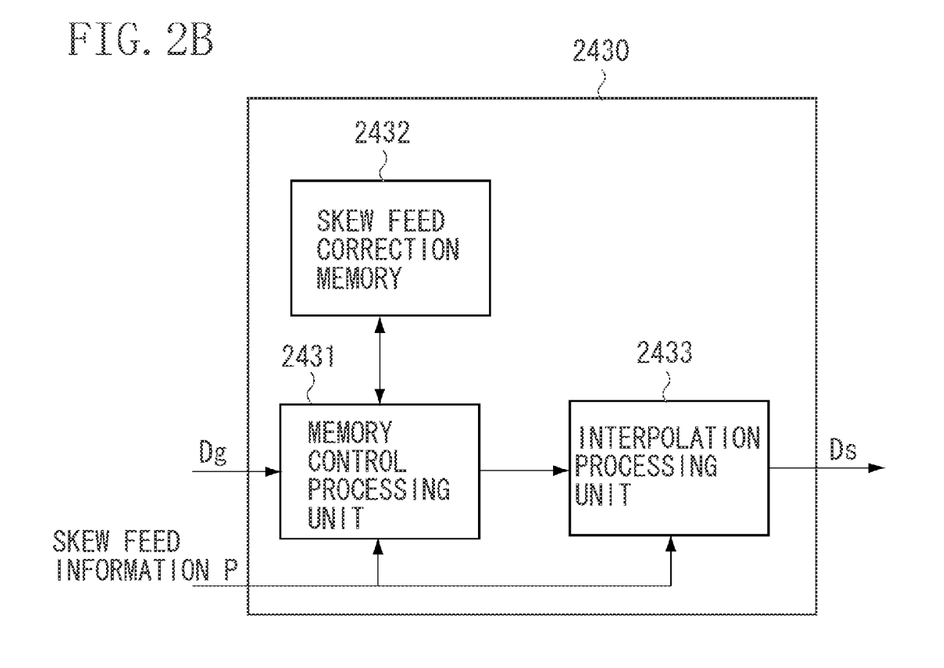
Figure 2C:
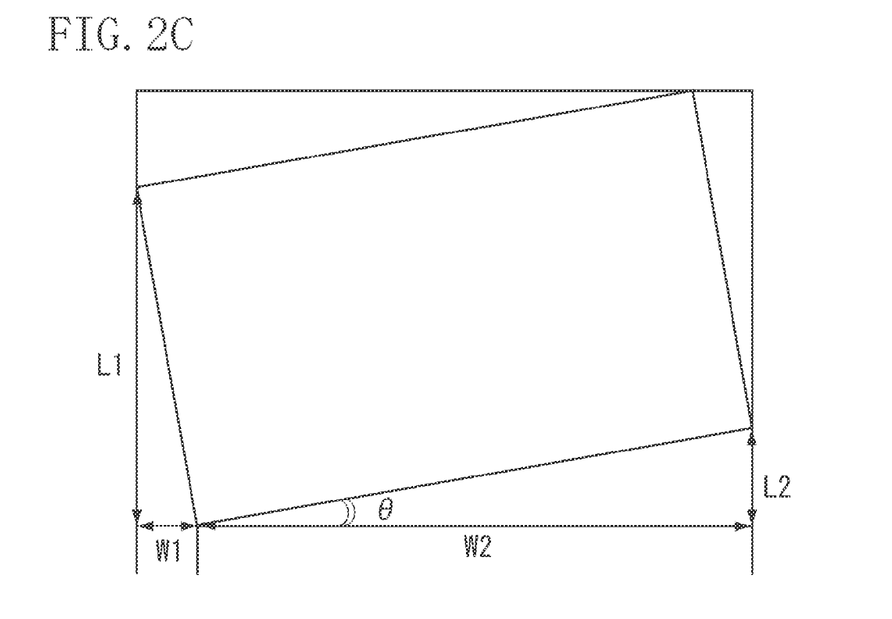

FIGS. 2A through 2C are block diagrams showing an example of a configuration of the scanner IF image processing unit 2400 illustrated in FIG. 1. FIG. 2A corresponds to the configuration of the entire scanner IF image processing unit 2400, FIG. 2B corresponds to details on a configuration of a second skew feed correction unit included in the scanner IF image processing unit 2400, and FIG. 2C corresponds to a skew feed conveyance model for illustrating a skew feed amount. The scanner IF image processing unit 2400 controls and corrects a document skew feed conveyance state electrically. In other words, the scanner IF image processing unit 2400 controls reading of image information written to a skew feed correction memory described below and corrects the skew feed.

In the document reading at an optical system fixation position in the case of a feeding-reading mode shown in FIG. 3 and described below, a shading correction unit 2410 inputs a Din pixel signal (See FIG. 2A) output from the scanner unit 140. Using a well-known technique, the shading correction unit 2410 performs correction processing with respect to unevenness in luminance due to the characteristics of the optical system and an imaging system so as to obtain an image of uniform brightness. A pixel signal Dsh that has undergone the shading correction processing is output to a subsequent stage.

Using a well-known technique, a gamma correction unit 2420 corrects a difference in color characteristic between a reading element and an apparatus. A pixel signal Dg that has undergone the gamma correction processing is output to the subsequent stage.

A skew feed correction unit 2430 obtains skew feed information P from the above described document detection sensor pair 1414 via the CPU 2100, and performs correction processing to prevent an image from being obliquely formed with respect to the sheet. More specifically, the skew feed correction unit 2430 executes image position correction processing based on the skew feed information P.

The skew feed information P is information including a main scanning correction width and a sub scanning correction width calculated by the CPU 2100 based on a skew feed amount θb. A skew feed correction processing method will be described in detail below. A pixel signal Ds that has undergone the skew feed correction processing is output to the subsequent stage.

A direct memory access (DMA) controller (DMAC) 2440 executes control to directly write the pixel signal Ds output from the skew feed correction unit 2430 to a designated region of the image memory (RAM 2110) as data Dout, not via the CPU 2100.

<Details on the Skew Feed Correction Unit>

The skew feed correction unit 2430 shown in FIG. 2B includes a memory control processing unit 2431, a skew feed correction memory 2432, and an interpolation processing unit 2433.

Operations of the memory control processing unit 2431 and of the skew feed correction memory 2432 will be described. The memory control processing unit 2431 mainly performs control as to which position (address) the pixel signal Dg input to the skew feed correction unit 2430 is to be written, or from which position the written pixel signal is to be read.

Through this control, a positional deviation of the image due to skew feed of the document is corrected in one pixel unit. In other words, the correction is realized by changing a writing position or a reading position of the skew feed correction memory 2432 with reference to the skew feed information P.

A leading edge or a trailing edge of the document conveyed is detected by the above described document detection sensor pair 1414. When the CPU 2100 obtains the skew feed amount from the detected timing, it is determined of necessity how normal image data without inclination is to be obtained by shifting the image data in what manner (i.e., by changing the writing position/reading position of the skew feed correction memory 2432 in what manner).

In the following, the skew feed correction processing will be described, taking the skew fed conveyance model shown in FIG. 2C as an example. Suppose, for example, a main scanning width W2 is 600 pixels and that a sub scanning width L2 is 6 lines as shown in FIG. 2C. At this time, when a deviation amount in the sub scanning direction is corrected, the writing position of the memory is shifted downwards by one line in 100-pixel increments (by one pixel in the sub scanning direction).

Further, suppose a main scanning width W1 shown in FIG. 2C is 4 pixels, and that the sub scanning width L1 is 400 lines. At this time, when the deviation amount in the main scanning direction is corrected, the memory reading position is shifted to the right by one pixel in 100-line increments.

Further, in FIG. 2C, when a skew feed amount θ and a document size in the drawing are known, the values W1, W2, L1, and L2 can be calculated by trigonometry. For example, assuming that the sub scanning size of the document is C1 lines, and that the main scanning size thereof is C2 pixels, W1=C1*sin θ, W2=C2*cos θ, L1=C1*cos θ, and L2=C2*sin θ. In the present exemplary embodiment, the skew feed information P is information including these values W1, W2, L1, and L2.

Figure 3:
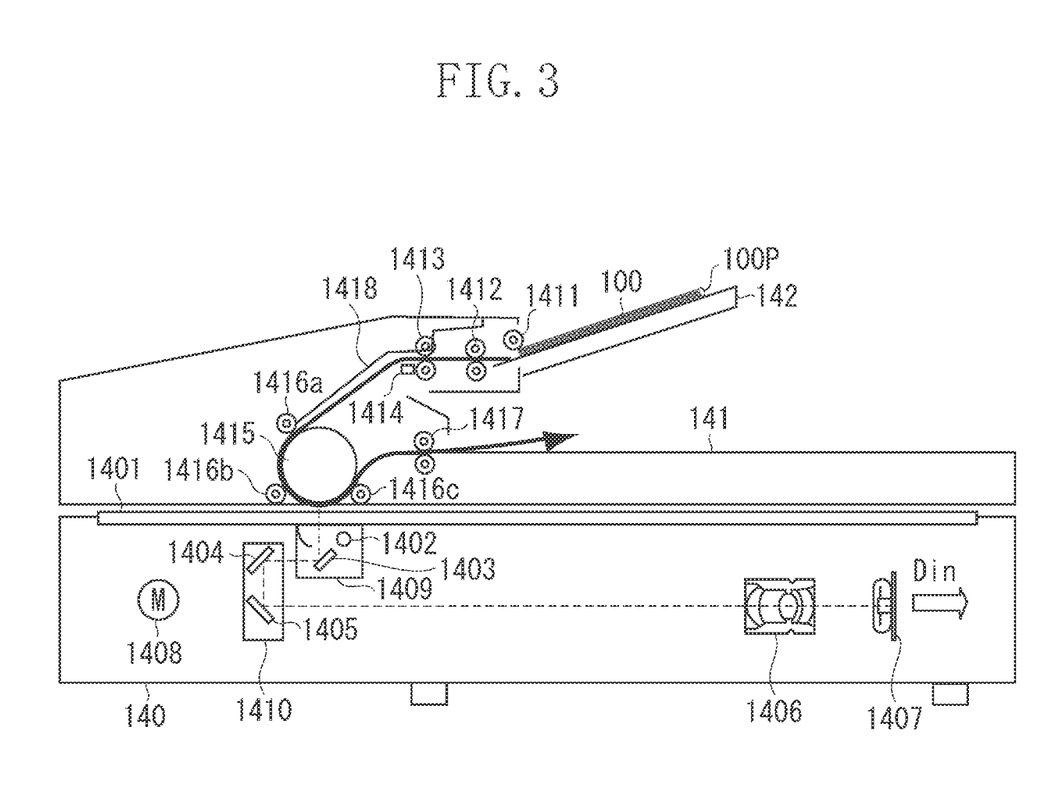
FIG. 3 is a sectional view illustrating a configuration of a scanner.

FIG. 3 is a sectional view illustrating the configuration of a scanner included in the image processing apparatus according to the present exemplary embodiment. In the present exemplary embodiment, it corresponds to the scanner unit 140 using a linear image sensor. In particular, in the example of FIG. 3, the main configuration and the reading operation in the case of "feeding-reading" in which a document is read by operating a document feeder 141 will be described. The scanner unit 140 is connected to a controller for image processing including a printer engine (not shown) so as to be capable of communication, and executes document reading processing described below according to a reading instruction from the controller.

In FIG. 3, a document stack 100P to be read is placed on a tray 142 by a user. Below the document conveyance direction, there are arranged a send-out roller 1411, a separation conveyance roller pair 1412, and a registration roller pair 1413. The registration roller pair 1413 is a first skew feed correction unit for correcting a skew feed conveyance state, and mechanically corrects the document skew feed state under control by the CPU 2100.

The send-out roller 1411 is rotated by a drive source (not shown), and sends out to the downstream side a sheet of the document separated from the document stack 100P placed on the tray 142. The separation conveyance roller pair 1412 arranged on the downstream side of the send-out roller 1411 includes a driving roller rotatable by the drive source and a stopping roller. Thus, the separation conveyance roller pair 1412 can separate and convey an uppermost document 100 from the conveyed document stack 100P. The registration roller pair 1413 arranged on the downstream side of the separation conveyance roller pair 1412 includes a registration roller connected to a drive source and rotatable, and a driven roller.

A rotation start of the registration roller pair 1413 serves as a reference for a conveyance timing of the document 100 and an image reading timing from this onward. As will be described in detail below, the rotatable registration roller 1413 includes a registration roller 1413a and a registration roller 1413b arranged so as to be perpendicular to the conveyance direction of the document 100, and has a function of correcting skew feed with respect to the document 100 during its conveyance.

The image forming apparatus according to the present exemplary embodiment executes skew feed correction processing by referring to document detection results obtained by the document detection sensor pair 1414 arranged on the downstream side of the registration roller pair 1413. Like the registration roller 1413, the document detection sensor pair 1414 includes a document detection sensor 1414a and a document detection sensor 1414b arranged so as to be perpendicular to the conveyance direction of the document 100.

The drive source for driving the send-out roller 1411, the separation conveyance roller pair 1412, and the registration roller pair 1413 may include, for example, a stepping motor. The document 100 discharged from the registration roller pair 1413 advances along a guide plate 1418, is pinched between a rotating large diameter conveyance drum 1415 and driven rollers 1416a, 1416b, and 1416c, and is conveyed along an outer periphery of the conveyance drum 1415. At this time, the document 100 passes once over a surface of a document positioning glass plate 1401, and is conveyed with constant velocity in the direction of an arrow in FIG. 3. The reading of the image of the document 100 by an image reading unit described below is performed when the document 100 passes over the surface of the document positioning glass plate 1401.

After the reading of the image, the document is continued to be conveyed along the outer periphery of the conveyance drum 1415, and is discharged onto the document feeder 141 by a sheet discharge roller 1417.

In the feeding-reading mode, it is only necessary to move the document in a fixed direction, a large quantity of documents can be read successively at high speed. Although in the present exemplary embodiment only one side of a document is read, the present invention is also applicable to an image reading apparatus which reads both sides of a document.

Next, the document reading operation in the image reading apparatus according to the present exemplary embodiment will be described. In the feeding-reading mode, the document 100 passes over the surface of the documents positioning glass plate 1401 as described above. At this time, a first mirror unit 1409 and a second mirror unit 1410 are moved by a motor 1408, and are fixedly arranged at positions shown in FIG. 3. Thus, when facing the surface of the document positioning glass plate 1401, the document 100 is irradiated with light from an illumination lamp 1402 in the first mirror unit 1409, and the reflection light therefrom travels by way of mirrors 1403, 1404, and 1405, and forms an image on a charge-coupled device (CCD) sensor 1407 by a lens 1406.

The reflection light input to the CCD sensor 1407 is converted to an electric signal by a sensor, and an electric signal of the pixel thereof is converted to digital data by an analog/digital (A/D) converter before being input to the controller 200 as a pixel signal Din.

Apart from the above described feeding-reading mode, there is a method in which image reading is performed by placing a document to be read on the document positioning glass plate 1401. In the case of this method, the first mirror unit 1409 including the mirror 1403 and the illumination lamp 1402 moves in the sub scanning direction at a speed V under the document positioning glass plate 1401 on which the document is placed. Further, the second mirror unit 1410 including the mirrors 1404 and 1405 moves in the same direction as the first mirror unit 1409 at a speed ½ V, whereby a front surface of the document 100 is scanned. The first mirror unit 1409 and the second mirror unit 1410 are driven by the motor 1408.

<Skew Feed Amount Detection at the Document Leading Edge Portion by the Document Detection Sensor Pair>

Figure 4A:
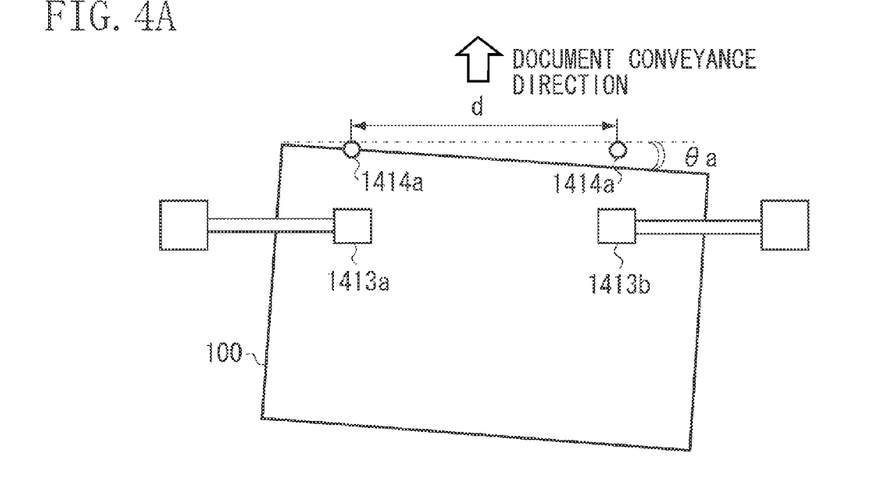
FIGS. 4A and 4B illustrate an example of how a document skew feed state is detected.
Figure 4B:
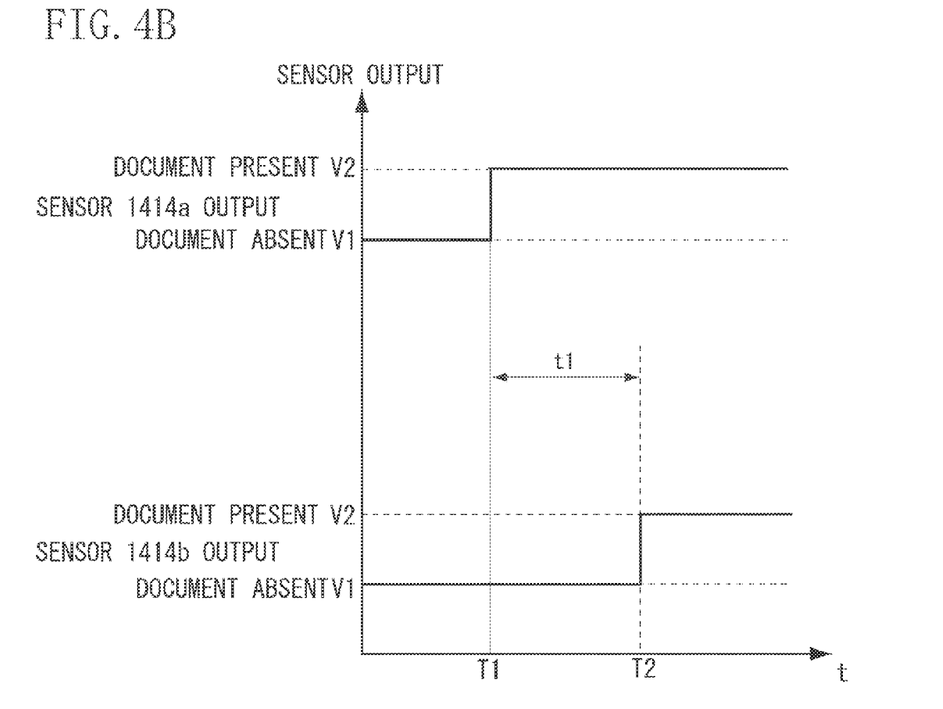

FIGS. 4A and 4B illustrate an example of a first skew feed correction processing in the image processing apparatus according to the present exemplary embodiment. FIG. 4A illustrates how the skew feed amount θa at the leading edge portion of the document conveyed is detected, and FIG. 4B is a timing chart illustrating a skew feed detection timing. In the following, to be described will be processing in which the controller 200 detects a skew feed state at the leading edge portion of the conveyed document by the document detection sensor pair 1414 and causes the registration roller pair to correct the skew feed.

To detect the skew feed amount, the above described document detection sensor pair 1414 is used. As shown in FIG. 4A, the document detection sensor pair 1414 includes the document detection sensor 1414a and the document detection sensor 1414*b* arranged in the direction perpendicular to the conveyance direction of the document 100.

The two document detection sensors 1414*a* and 1414*b* are arranged so as to be spaced apart from each other by a distance d. As each of the document detection sensors 1414*a* and 1414*b*, it is possible to use, for example, a well-known reflection type sensor equipped with a light emitting portion and a light receiving portion. In the present exemplary embodiment, the document detection sensors 1414*a* and 1414*b* are situated on a rear side of the registration rollers 1413*a* and 1413*b* with respect to the document conveyance direction. Further, the document detection sensor pair 1414 and the registration roller pair 1413 are arranged at a distance that is relatively short with respect to a vertical length of the document 100.

In the conveyance state shown in FIG. 4A, the document 100 is skew-fed counterclockwise by an angle θa with respect to the document conveyance direction (skew feed at the leading edge of the document). Further, in this state, the leading edge of the document is detected by the document detection sensor pair 1414.

The timing chart of FIG. 4B shows the detection timing of the skew feed amount θa of the document 100 in this case. In FIG. 4B, a vertical axis indicates the sensor outputs (document-present output and document-absent output) respectively with respect to the document detection sensors 1414*a* and the document detection sensor 1414*b*, and a horizontal axis indicates passage of time t. As shown in FIG. 4B, when the document 100 is skew-fed, the output of the document detection sensor 1414*a* changes from document absent (V1) to document present (V2) at time T1. Further, at time T2, the output of the document detection sensor 1414*b* changes from document absent (V1) to document present (V2). Thus, the difference in time between the changes is obtained as follows: T2−T1=t1 (where T2>T1).

At this time, assuming that the conveyance speed of the document 100 is s (mm/sec), the CPU 2100 obtains the skew feed amount θa from the following equation:

$$\theta a = \tan^{-1}\{s*t1/d\}$$

This calculation processing may be performed by a CPU (not shown) mounted in the scanner unit 140, or by the CPU 2100 in the controller 200 described below.

The processing of controlling the driving of the registration roller pair 1413 based on the detected skew feed amount θa will be described in detail below with reference to FIG. 7. In the following, to be described will be a case in which there are executed first skew feed correction processing, in which the skew feed amount of the document leading edge detected by the controller 200 (a first document skew feed amount) is corrected by control of the driving of the registration roller pair 1413, and second skew feed correction processing described below. The second skew feed correction processing corresponds to processing in which the controller 200 detects the skew feed state at the trailing edge portion of the document being conveyed by the document detection sensor pair 1414 and the skew feed is electrically corrected by image processing by the scanner IF image processing unit 2400.

<Details on Skew Feed Correction by the Registration Roller Pair>

Figure 5A:
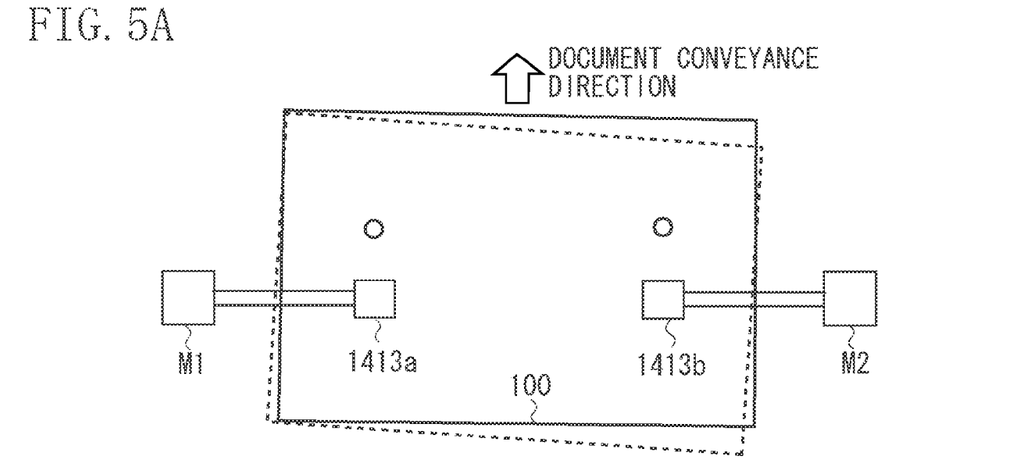
FIGS. 5A through 5C illustrate a skew feed correction mechanism in the image processing apparatus.
Figure 5B:
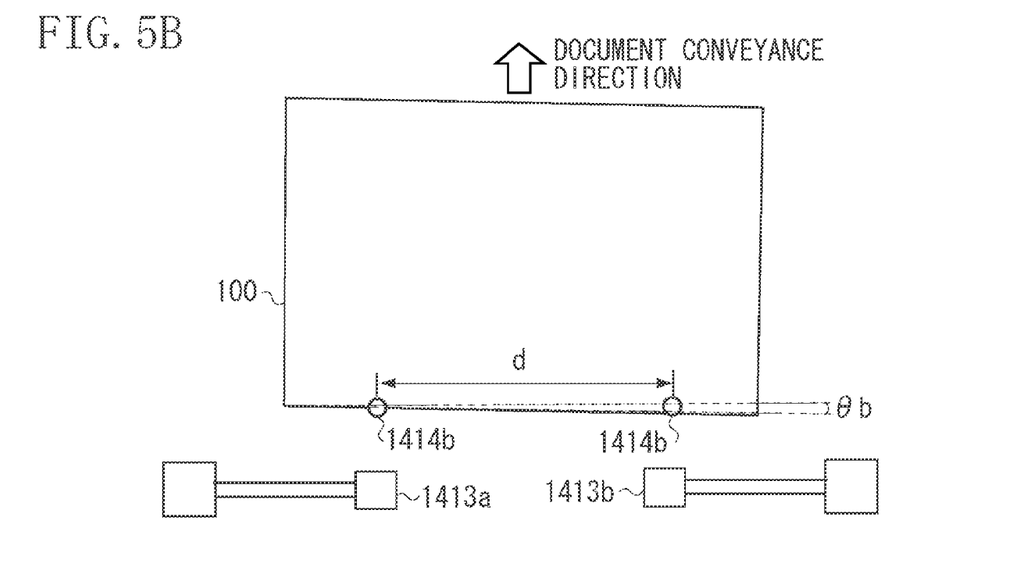
Figure 5C:
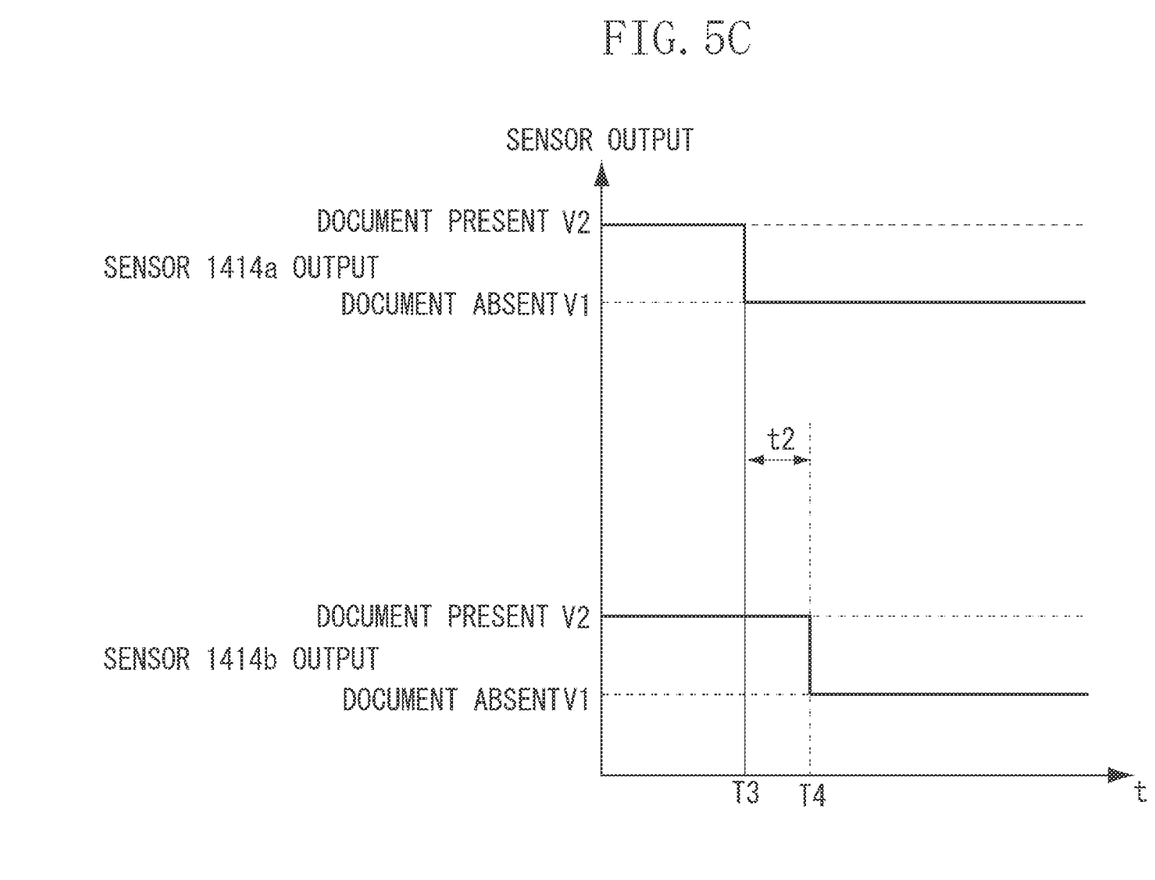

FIGS. 5A through 5C illustrate examples of the first skew feed correction processing in the image processing apparatus of the present exemplary embodiment. In the example of the skew feed correction shown in FIG. 5A, the driving of the registration roller pair 1413 is controlled to mechanically correct the skew fed of the document 100.

In the skew feed correction according to the present exemplary embodiment, the controller 200 controls the first skew feed correction by the registration roller pair 1413 and the second skew feed correction through image processing by the scanner IF image processing unit 2400. Here, the former processing, i.e., the first skew feed correction processing by the registration roller pair 1413 will be described. Actually, the controller 200 controls the rotation speeds of the registration roller 1413*a* and the registration roller 1413*b* based on the skew feed amount θa detected at the leading edge portion of the document 100 described above. The skew feed amount θa will be referred to as the first document skew feed amount.

Stepping motors M1 and M2 for controlling the rotation speeds of the registration roller 1413*a* and the registration roller 1413*b* are driven independently. Thus, rotation of the registration rollers 1413*a* and 1413*b* can be independently (selectively) stopped, decelerated, or accelerated.

Further, in the present exemplary embodiment, the skew feed correction is effected through acceleration or deceleration control of the rotation speed of the preceding registration roller 1413*a* exclusively for a fixed period of time. More specifically, the rotation speed is reduced until half the target correction amount is attained, and, from the point in time when half the correction has been completed, the rotation speed is increased and restored to the speed before the deceleration, so that the correction can be realized. The processing of calculating the deceleration amount of the rotation speed from the skew feed amount θa is executed by a reader CPU included in the scanner unit 140 according to an instruction by the controller 200.

The first skew feed correction processing by the registration rollers 1413*a* and 1413*b* is performed for the purpose of correcting the skew feed amount up to a range where it is possible to perform the second skew feed correction of subsequent image processing by the scanner IF image processing unit 2400.

For example, in the skew feed correction of the subsequent image processing by the scanner IF image processing unit 2400, if the skew feed range of x° or less is the target (possible), a skew feed amount in excess of x° is mechanically corrected to x° or less in the skew feed correction by the registration rollers 1413*a* and 1413*b*.

If it is guaranteed that the document conveyance is performed within a range (x° or less) where skew feed correction of the subsequent image processing by the scanner IF image processing unit 2400 is possible, it is no need to execute the correction processing through skew feed correction by the registration rollers 1413*a* and 1413*b*.

<Skew Feed Amount Detection at the Document Trailing Edge Portion by the Document Detection Sensor Pair>

FIG. 5B illustrates a method of detecting the skew feed amount θb at the trailing edge portion of the document 100 being conveyed. Here, the skew feed amount θb will be referred to as the second document skew feed amount. As described above, the skew feed correction is of two categories, the first skew feed correction by the registration rollers 1413*a* and 1413*b*, and the second skew feed correction through image processing. The skew feed amount detection at the document trailing edge portion is effected for the latter category skew feed correction, i.e., the correction through image processing by the scanner IF image processing unit 2400. As will be described below, the skew feed correction through image processing is conducted by the scanner IF image processing unit 2400 in the controller 200.

As in the case of detection at the leading edge portion, the above described document detection sensor pair 1414 is used for the detection of the skew feed amount at the trailing edge of the document being conveyed. In the state shown in FIG. 5B, the document 100 is skew-fed counterclockwise by an angle θb with respect to the conveyance direction, and the trailing edge portion of the document 100 is detected by the document detection sensor pair 1414.

At this time, the timing with which the trailing edge portion of the document 100 is detected by the document detection sensor pair 1414 is the timing after the skew feed correction by the above described registration rollers 1413a and 1413b. In other words, with this timing, the document 100 is off the conveyance range in which it is conveyed by the registration rollers 1413a and 1413b.

Thus, the skew feed amount θb detected at this time is a correction error generated depending on the precision of the skew feed correction by the above described registration rollers 1413a and 1413b. Generally speaking, high precision correction is difficult to perform with the mechanical skew feed correction alone which is conducted through rotation speed adjustment of the registration rollers 1413a and 1413b without stopping the conveyance of the document.

FIG. 5C shows the timing with which the skew feed amount θb of the document 100 is detected in this case. In the timing chart of FIG. 5C, in a case in which the document 100 is still skew fed to some degree even after the skew feed correction by the registration rollers 1413a and 1413b, the output of the document detection sensor 1414a is changed at the time T3 from document present (V2) to document absent (V1).

Further, the output of the document detection sensor 1414b changes from document present (V2) to document absent (V1) at the time T4. Thus, there is generated a difference in time between the changes, T4−T3=t2 (where T4>T3).

At this time, assuming that the conveyance speed of the document 100 is s (mm/sec), the skew feed amount θb can be obtained by the following equation.

$$\theta b = \tan^{-1}\{s*t2/d\}$$

This computation may be performed by the CPU (not shown) mounted in the scanner unit 140, or by the CPU in the controller 200 described below.

As described above, the detection of the skew feed amount at the trailing edge portion of the document is conducted after the skew feed correction by the registration rollers 1413a and 1413b, so that the following relationship is inevitably satisfied, θb<θa. Further, if the correction precision of the mechanical skew feed correction through the adjustment of the rotation speed of the registration rollers 1413a and 1413b (the above described x°) is known from the first, it is possible to define the maximum angle of θb.

Accordingly, it is possible to define the correction maximum angle (correction range) of the skew feed correction through image processing in the controller 200 described below (details of which will be described below).

Figure 6A:
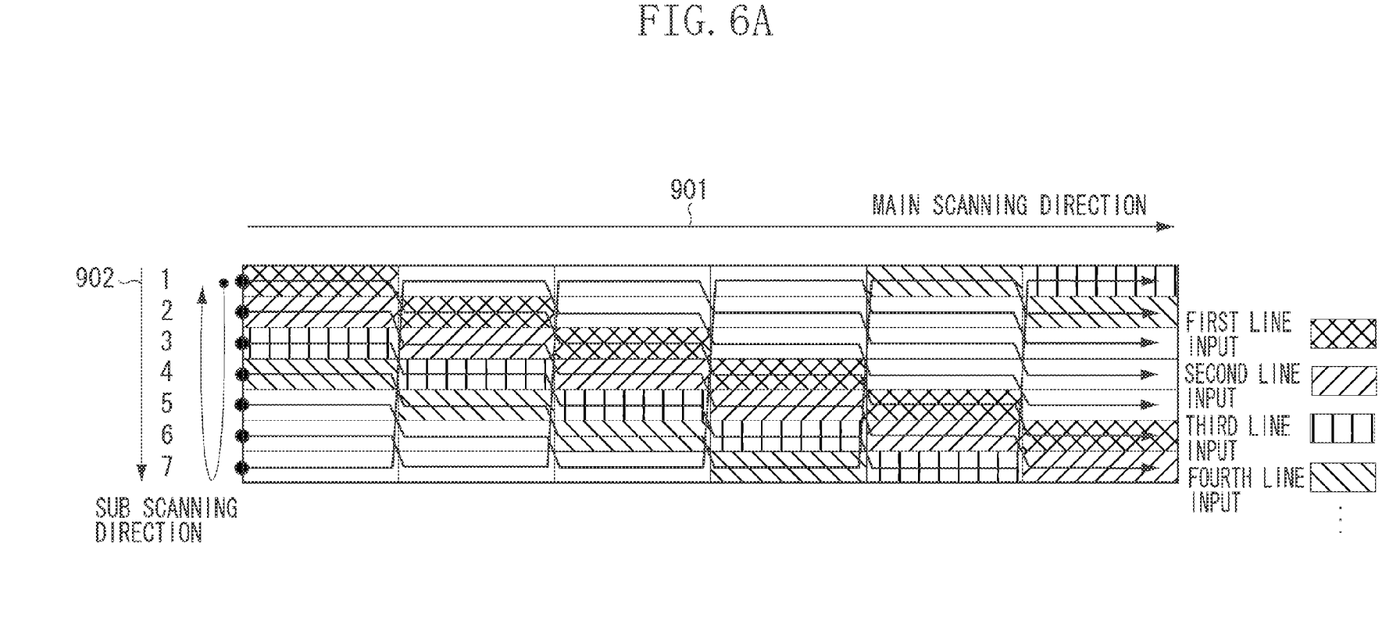
FIGS. 6A and 6B illustrate how writing or reading to or from a skew feed correction memory is performed.
Figure 6B:
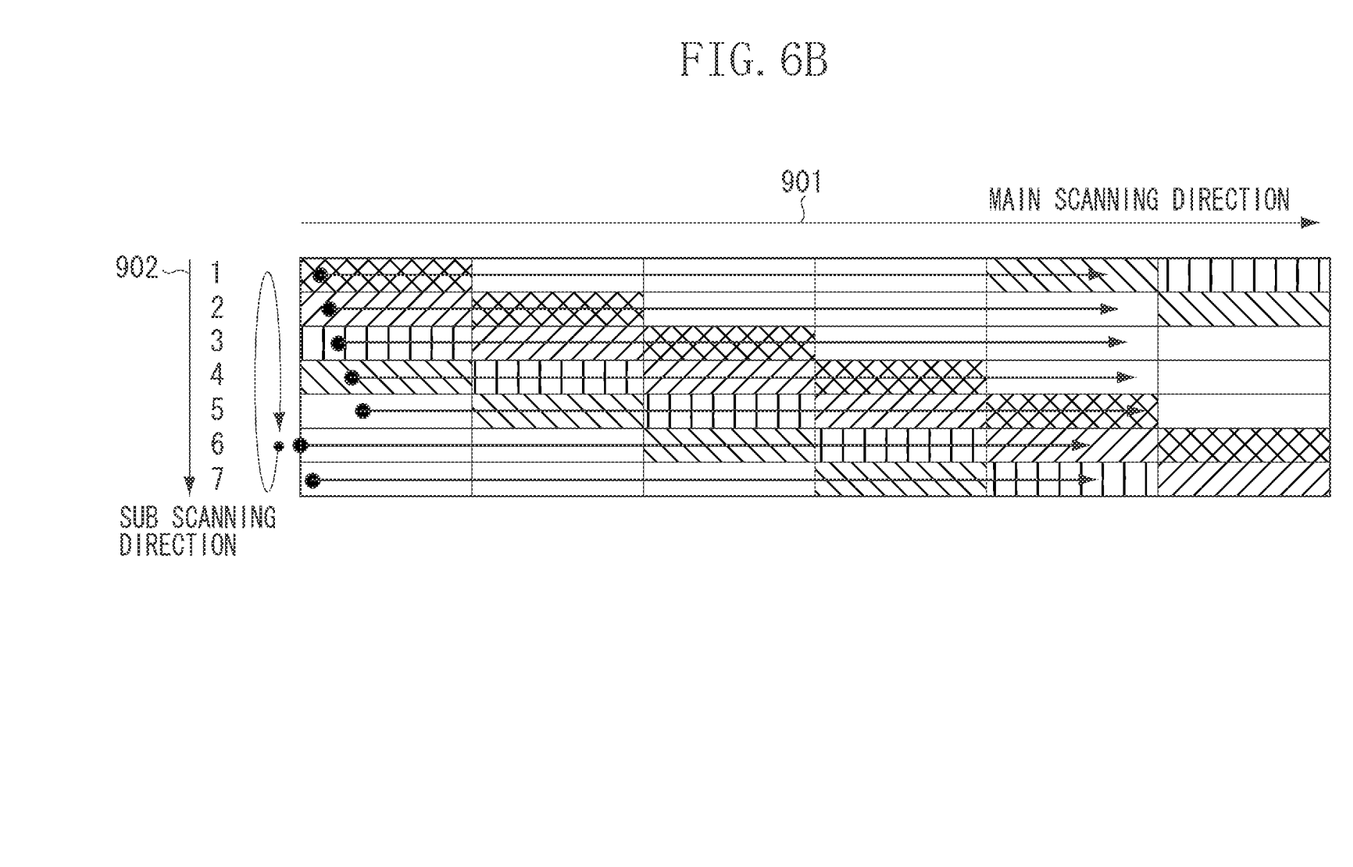

Next, an example of the control of the writing to the skew feed correction memory 2432 by the memory control processing unit 2431 will be described with reference to FIGS. 6A and 6B. FIGS. 6A and 6B illustrate the processing of writing or reading to or from the skew feed correction memory 2432 shown in FIG. 2B. In FIGS. 6A and 6B, there are included the main scanning direction 901 and the sub scanning direction 902. FIG. 6A shows how the pixel signal Dg is written to the skew feed correction memory 2432, and FIG. 6B shows how the pixel signal Dg is read from the skew feed correction memory 2432.

A size in the main scanning direction of the skew feed correction memory 2432 prepared corresponds to the pixels corresponding to the size W1+W2 shown in FIG. 2C. A size in the sub scanning direction of the skew feed correction memory 2432 prepared corresponds to the deviation amount L2+1 line due to the skew feed amount θb mentioned above.

At this time, if the correction precision of the above described mechanical skew feed correction through the adjustment of the rotation speed of the registration rollers 1413a and 1413b (the above described x°) is known, the maximum value of the angle θb can be obtained, so that it is possible to previously calculate the maximum size of the skew feed correction memory 2432 to be prepared as the hardware.

In the example shown in FIG. 6A, the size in the sub scanning direction is L2 (6 lines)+1 line, i.e., 7 lines. The pixel signal Dg input at this time is written in the direction of an arrow in the drawing. The pixel signal Dg input corresponds to all the pixels in the rectangular region enclosed by the dashed line shown in FIG. 5A.

If the skew feed amount θb is 0 degrees, the writing is performed in the main scanning direction 901. However, as in the present exemplary embodiment, when the skew feed amount θb is not 0 degrees, the memory control processing unit 2431 controls the writing to the skew feed correction memory 2432 as follows.

When the skew feed takes place as in the present exemplary embodiment, the memory control processing unit 2431 writes the pixel signal Dg to the skew feed correction memory 2432 while shifting the writing position in the sub scanning direction 902, and corrects the positional deviation in the sub scanning direction in one pixel (1 line) unit. For example, when, as described above, the width W2 in the main scanning direction shown in FIG. 2C corresponds to 600 pixels, and the width L2 in the sub scanning direction corresponds to 6 lines, the writing position is shifted one line downwards in increments of 100 pixels. As a result, the positional deviation in the sub scanning direction 902 is corrected in increments of 1 line (pixel).

Next, an example of the control to read the pixel signal Ds from the skew feed correction memory 2432 by the memory control processing unit 2431 will be described with reference to FIG. 6B. As described above, when the writing to the skew feed correction memory 2432 is performed, the positional deviation in the sub scanning direction due to the skew feed of the document is corrected by the memory control processing unit 2431, so that the reading is effected in the direction of arrows in the drawing in the main scanning direction 901.

At this time, the position in the main scanning direction where the reading is started is shifted line by line. For example, when, as described above, the scanning width W1 in the main scanning direction of FIG. 2C corresponds to 4 pixels, and the sub scanning width L1 corresponds to 400 lines, the reading start position is shifted by one pixel to the right in 100 line unit. As a result, the positional deviation in the main scanning direction can be corrected in increments of 1 pixel.

In the case in which the skew feed correction memory 2432 only has 7 lines (L2+1) as in the present exemplary embodiment, when the writing of the seventh line on the memory is completed, the writing position in the sub scanning direction is returned to the foremost line as shown in FIGS. 6A and 6B. This is the same as in the case of reading.

And, when the writing start position in the sub scanning direction 902 comes the seventh line (L2+1), the memory control processing unit 2431 starts the memory reading control from the sixth line (L2).

Further, when the writing start position is returned to the first line, the reading is performed at the seventh line, and, when the writing start position is the second line, the reading is performed at the first line. In this way, the memory control processing unit 2431 synchronously controls the writing and reading to and from the skew feed correction memory 2432. As a result, even when the memory capacity of the skew feed correction memory 2432 is rather small with respect to the image size, it is possible to perform the skew feed correction through writing (or reading) without corrupting the image data and to output the same to the subsequent processing.

In the above described memory control in which an image signal is written or read, the correction can only be performed in 1 pixel unit with respect to the main scanning direction and the sub scanning direction, so that jaggy are generated in the image data. Thus, the interpolation processing unit 2433 smoothens out the jaggy through interpolation processing. In other words, correction of less than one pixel can be executed. The image interpolation processing is executed by a bilinear method or a bi-cubic method, which is a well-known technique.

<Processing Flowchart>

Figure 7:
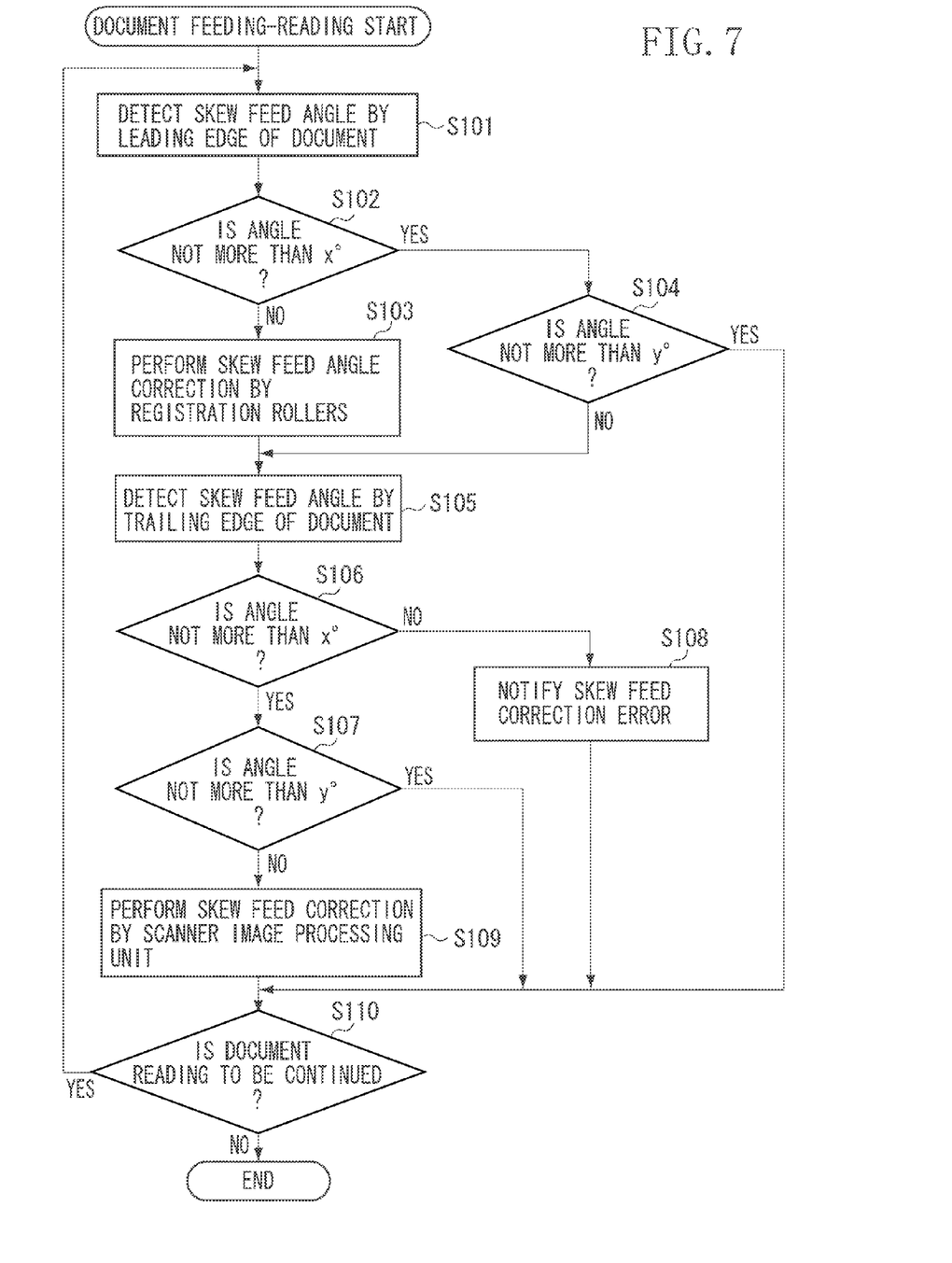
FIG. 7 is a flowchart illustrating an example of skew feed correction control in the image processing apparatus.

FIG. 7 is a flowchart illustrating an example of the skew feed correction control in the image processing apparatus of the present exemplary embodiment. Each of processing steps S101 to S110 is realized by loading a program stored in the HDD 2130 to the RAM 2110 and executing the program by the CPU 2100. In the following, the document skew feed correction control based on how the leading edge or the trailing edge of the document is detected by the document detection sensor pair 1414 will be described in detail.

First, in step S101, the CPU 2100 detects the skew feed amount θa of the document at the leading edge portion of the document conveyed in the feeding-reading mode. The detection of the skew feed amount is executed by the CPU of the scanner 140 with using the document detection sensor pair 1414, and the CPU 2100 of the controller 200 is notified of the detection result, so that the CPU 2100 can recognize the skew feed amount.

Next, in step S102, the CPU 2100 determines whether the skew feed amount θa detected is not more than an angle x° or not. Here, the angle x° is a threshold angle of the correction precision of the mechanical skew feed correction performed on the subsequent stage by the registration rollers 1413a and 1413b (a first skew feed correction threshold amount).

In step S102, when the CPU 2100 determines that the detected skew feed amount θa is in excess of the angle x° (NO in step S102), the procedure advances to step S103 to perform the mechanical skew feed correction by the registration rollers 1413a and 1413b.

And, in step S103, the CPU 2100 gives an instruction to the CPU in the scanner 140 to execute the processing of correcting the skew feed mechanically through rotation speed adjustment of the registration roller pair 1413 based on the skew feed amount detected.

On the other hand, when, in step S102, the CPU 2100 determines that the detected skew feed amount θa is not more than the angle x° (YES in step S102), there is no need to perform the mechanical skew feed correction, so the procedure advances to step S104.

In step S104, it is determined whether the skew feed amount θa is not more than an angle y°. Here, the angle y° is a threshold angle of the correction precision of the skew feed correction performed by the scanner image processing unit 2400 on the subsequent stage (a second skew feed threshold value) which is more precise than the above described mechanical skew feed correction.

In step S104, when the CPU 2100 determines that the skew feed amount θa detected is not more than the angle y° (YES in step S104), there is no need to execute the first and the second skew feed correction described above, so that the procedure advances to step S110. On the other hand, when, in step S104, the CPU 2100 determines that the skew feed amount θa detected is in excess of the angle y° (NO in step S104), the procedure advances to step S105 to execute the second skew feed correction.

And, in step S105, the CPU 2100 receives the detection result of the skew feed amount θb of the document at the trailing edge portion of the document conveyed in the feeding-reading mode from the scanner 140.

The skew feed amount detection processing in step S105 is conducted using the document detection sensor pair 1414 as in step S101. Further, when the angle is detected in step S105, the first skew feed correction processing by the registration roller pair 1413 in step S103 is in the completed state. Thus, when the processing in step S103 is executed and the operational flow to execute the processing in step S105 is followed, an angle to be detected in step S105 is different from that in step S101.

Next, in step S106, the CPU 2100 determines whether the skew feed amount θb detected in step S105 is not more than the angle x° or not. Here, when the CPU 2100 determines that the angle x° is exceeded (NO in step S106), it means that the mechanical skew feed correction processing by the registration roller pair 1413 has not been properly conducted, and the procedure advances to step S108.

Figure 8:
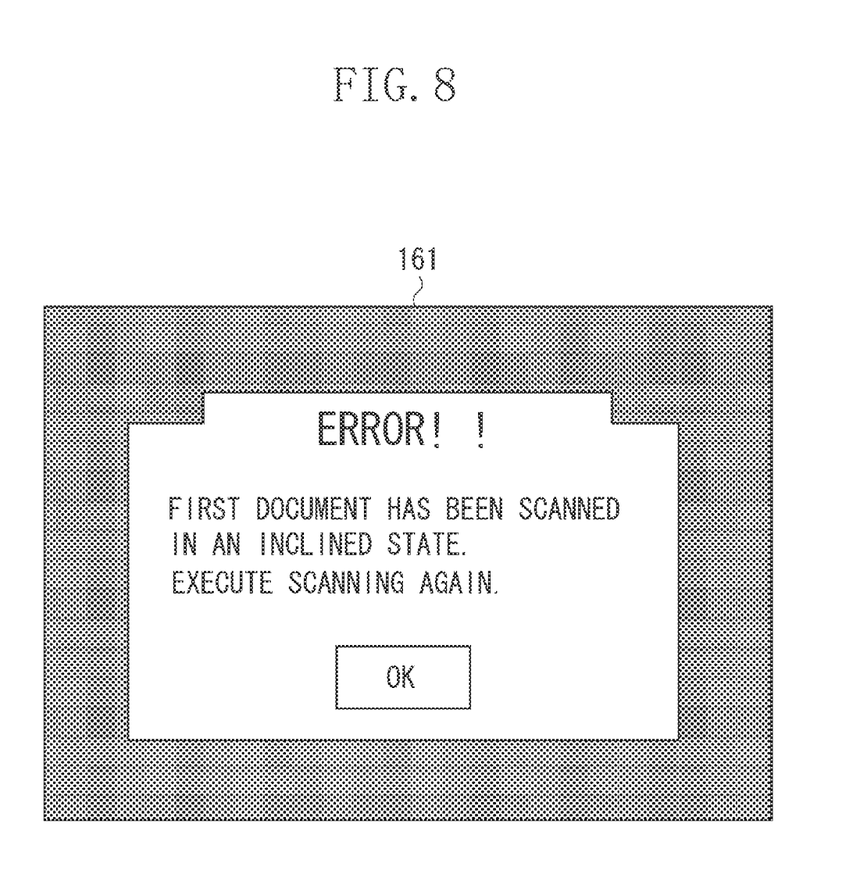
FIG. 8 illustrates an example of a user interface (UI) displayed on the image processing apparatus.

And, in step S108, the CPU 2100 displays on a liquid crystal operation panel 161 of the operation unit 160 a message indicating a skew feed correction error, an example of which is shown in FIG. 8, to notify the user of the condition, and the procedure advances to step S110. On the other hand, when, in step S106, the CPU 2100 determines that the skew feed amount θb detected in step S105 is not more than the angle x° (YES in step S106), it is determined that the mechanical skew feed correction processing by the registration roller pair 1413 has been properly executed, and the procedure advances to step S107.

And, in step S107, the CPU 2100 determines whether the skew feed amount θb detected is not more than the angle y°. As described above, the angle y° is the threshold angle of the correction precision of the skew feed correction performed by the scanner image processing unit 2400 on the subsequent stage.

In step S107, when the CPU 2100 determines that the skew feed amount θb detected in step S105 is in excess of the angle y° (NO in step S107), the procedure advances to step S109 to execute the second skew feed correction.

And, in step S109, the CPU 2100 causes the skew feed correction unit 2430 in the scanner IF image processing unit 2400 to execute the above described second skew feed correction processing. Unlike the first skew feed correction in step S103, in the second skew feed correction in step S109, correction processing is executed as image data processing. Thus, the correction precision is different from that of the skew feed correction in step S103.

On the other hand, in step S107, when the CPU 2100 determines that the skew feed amount θb detected in step S105 is not more than the angle y° (YES in step S107), it is determined that there is no need for the skew feed correction by the scanner image processing unit 2400, and the procedure advances to step S110.

And, in step S110, the CPU 2100 determines whether the image reading is to be continued or not based on the notification from the scanner 140. This is determined according to whether a document still remains on the tray 142 of the document feeder 141. Here, in a case where the CPU 2100 has been notified by the scanner 140 that a document to be read remains on the tray 142 (YES in step S110), the procedure returns to step S101. When no document to be read remains, the present processing is completed.

According to the exemplary embodiment of the present invention, it is provided a configuration in which a single document detection sensor is provided on the upstream side of the registration roller pair for conveying a document, and it is possible to execute skew feed correction according to a document skew feed amount obtained by detection of the leading edge and the trailing edge of the document conveyed and passed on the document detection sensor. Thus, there is no need to provide detection sensors at two positions, and costs can be reduced.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-221380 filed Sep. 25, 2009, which is hereby incorporated by reference herein in its entirety.

What is claimed is:

1. An apparatus comprising:
a conveyance unit configured to convey a document;
a first detection unit configured to detect a first deviation amount of the document by measuring a leading edge of the document conveyed by the conveyance unit;
a first correction unit configured to correct deviation of the document by rotating the document conveyed by the conveyance unit, if the first deviation amount is larger than a first predetermined value;
an input unit configured, after the first correction unit corrects deviation of the document, to read the document and to input image data of the document;
a second detection unit configured to detect a second deviation amount of the document by measuring a trailing edge of the document conveyed by the conveyance unit; and
a second correction unit configured to correct deviation of the document by executing image processing for the image data of the document input by the input unit, if the second deviation amount is larger than a second predetermined value which is smaller than the first predetermined value.

2. The apparatus according to claim 1, wherein the first correction unit corrects the deviation by controlling driving of a registration roller of the conveyance unit.

3. The apparatus according to claim 1, further comprising a storage unit configured to store the input image data, wherein the second correction unit controls timing at which the image data is written to the storage unit or timing at which the image data is read from the storage unit to correct the deviation.

4. A method for controlling an apparatus, the method comprising:
conveying a document by a conveyance unit;
detecting a first deviation amount of the document by measuring a leading edge of the document conveyed by a conveyance unit;
correcting deviation of the document by rotating the document conveyed by the conveyance unit, if the first deviation amount is larger than a first predetermined value;
reading, after correcting deviation of the document, the document and inputting image data of the document;
detecting a second deviation amount of the document by measuring a trailing edge of the document conveyed by the conveyance unit; and
correcting deviation of the document by executing image processing for the image data of the document input by an input unit, if the second deviation amount is larger than a second predetermined value which is smaller than the first predetermined value.

5. The method according to claim 4, wherein the correcting deviation includes controlling driving of a registration roller of the conveyance unit.

6. The method according to claim 4, further comprising:
storing the input image data,
controlling timing at which the image data is written to a storage unit or timing at which the image data is read from the storage unit to correct the deviation.

7. A non-transitory computer readable storage medium storing a computer-executable program of instructions for causing a computer to perform a method comprising:
conveying a document;
detecting a first deviation amount of the document by measuring a leading edge of the document conveyed by a conveyance unit;
correcting deviation of the document by rotating the document conveyed by the conveyance unit, if the first deviation amount is larger than a first predetermined value;
reading, after correcting the deviation of the document, the document and inputting image data of the document;
detecting a second deviation amount of the conveyed document by measuring a trailing edge of the document conveyed by the conveyance unit; and
correcting deviation of the document by executing image processing for the image data of the document input by an input unit, if the second deviation amount is larger than a second predetermined value which is smaller than the first predetermined value.

8. The non-transitory computer readable storage medium according to claim 7, wherein the correcting deviation includes controlling driving of a registration roller of the conveyance unit.

9. The non-transitory computer readable storage medium according to claim 7, further comprising:
storing the input image data,
controlling timing at which the image data is written to a storage unit or timing at which the image data is read from the storage unit to correct the deviation.

* * * * *